Aug. 10, 1926.

J. M. BROWN 1,595,960

EFFICIENCY INDICATOR FOR AUTOMOTIVE VEHICLES

Filed March 1, 1922      2 Sheets-Sheet 1

WITNESSES:
C. Alfred Corbitt
J. E. Foster

INVENTOR
James M. Brown
BY
J. H. Procter
ATTORNEY

Aug. 10, 1926.
J. M. BROWN
1,595,960
EFFICIENCY INDICATOR FOR AUTOMOTIVE VEHICLES
Filed March 1, 1922   2 Sheets-Sheet 2

WITNESSES:

INVENTOR
James M. Brown.
BY
ATTORNEY

Patented Aug. 10, 1926.

1,595,960

UNITED STATES PATENT OFFICE.

JAMES M. BROWN, OF PITTSBURGH, PENNSYLVANIA, ASSIGNOR OF ONE-HALF TO C. ALFRED CORBETT, OF IRWIN, PENNSYLVANIA.

EFFICIENCY INDICATOR FOR AUTOMOTIVE VEHICLES.

Application filed March 1, 1922. Serial No. 540,377.

My invention relates to indicating devices and particularly to devices for indicating the efficiency of automotive vehicles.

One object of my invention is to provide an indicating device to indicate the speed an automotive vehicle should normally be traveling at any throttle opening at a definite gear ratio.

Another object of my invention is to provide an indicating device, of the above indicated character, that shall indicate the speed that the vehicle should be traveling at any throttle opening irrespective of the grade being traversed.

Another object of my invention is to provide a device of the above indicated character which may be utilized in connection with an ordinary speedometer to determine the efficiency of the motor of the automotive vehicle.

A further object of my invention is to provide an indicator, of the above-indicated character, that shall be compact, simple in construction and effective in its operation.

In practicing my invention I provide a pivotally mounted drum upon which is formed a scale or chart. An eccentrically pivoted weight is disposed within the drum and so geared thereto that the drum will be turned an amount proportional to the grade being traversed by the vehicle. A pointer is provided for co-operation with the scale and is actuated in accordance with the position of the throttle of the engine. The indication obtained represents the speed the vehicle should be obtaining under normal conditions at all times. If this speed is different from that indicated by the speedometer at that instant the vehicle is operating below its normal efficiency and should be examined for the defects. I further provide hand set indicators for keeping an account of the fuel and lubricant used each trip, or over any period of time.

In the accompanying drawings Fig. 1 is a front elevational view of an indicating device embodying my invention;

Figure 1:
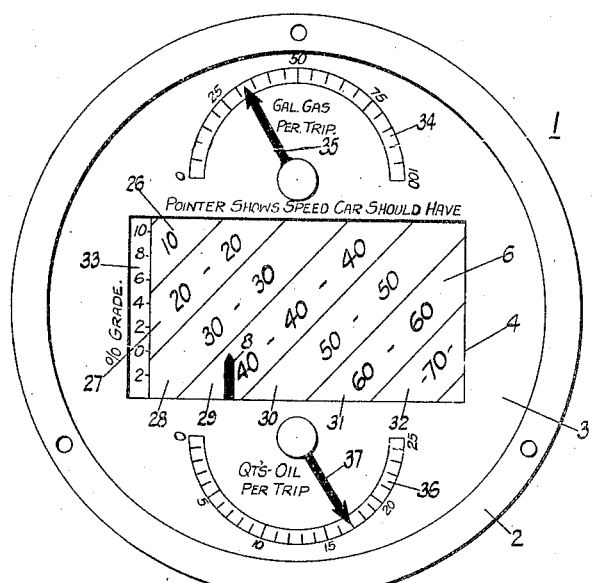

An indicating device 1 for an automotive vehicle 38 is mounted on the instrument panel 46 and comprises, in general, a casing 2, a front plate 3, having an opening 4 therein, and a drum 5 having a scale or chart 6 thereon that is disposed in the opening 4 and actuated by a weight 7 in accordance with the grade being traversed by the vehicle. A pointer 8 is also provided which is actuated through a wire 9 by the throttle lever 10 or accelerator pedal 11 of the vehicle 38.

A frame 12 is disposed within the casing 2 and it supports one end of a shaft 13, the other end of which is supported in a bracket 42 on the frame 12. The weight 7 is mounted on the shaft 13. Two sleeves 14 and 15 are pivotally mounted on a bracket 39 and the portion 40 of the frame 12, respectively, and the drum 5 is mounted on the sleeves. A gear wheel 16 is secured to the sleeve 15 and it engages a gear wheel 17 that is mounted on a small shaft 18 upon which is also mounted a pinion 19 that is mounted on a bracket 41 on the frame 12. The pinion 19 engages a gear wheel 20 on the shaft 13.

Figure 2:
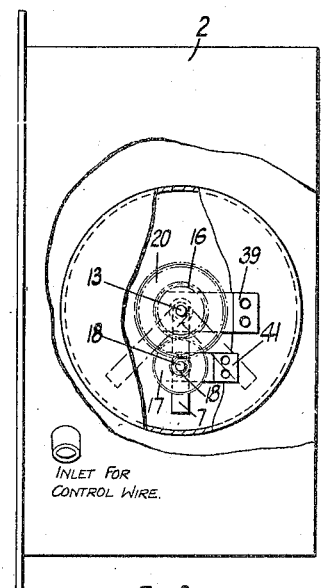
Fig. 2 is a side elevational view with parts broken away, of the device shown in Fig. 1.
Figure 3:
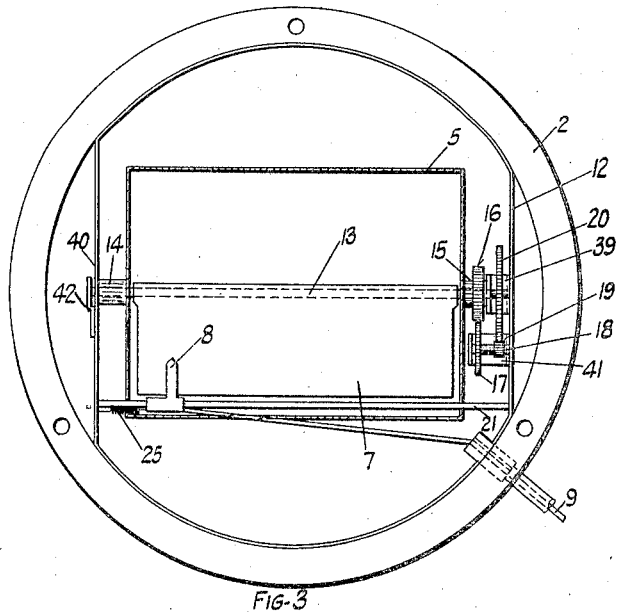
Fig. 3 is a front view of the device shown in Fig. 1 with the front plate removed.

Since the weight 7 is mounted eccentrically with respect to the shaft 13 it will, by reason of the force of gravity assume various positions as shown in the broken lines in Fig. 2 when the vehicle is traversing various grades. When the weight turns, or rather when the casing 2 turns, with respect to the weight by reason of the vehicle traversing various grades, the drum 5 will be turned in accordance with the grade.

Figure 4:
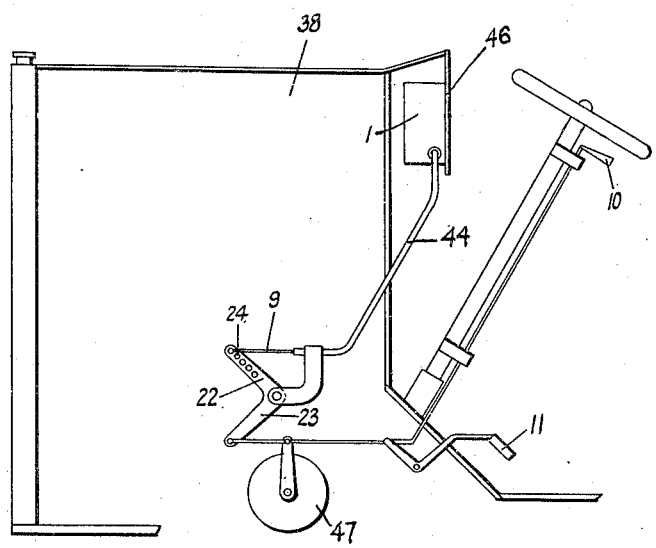
Fig. 4 is a diagrammatic view of an automotive vehicle illustrating the mechanism for actuating the pointer of the indicator.

A guide rod 21 is also mounted in the frame 12 and the slidable pointer 8 is mounted on the rod. The wire 9 is connected at one end to the pointer 8, passes through a tube 44 and is connected at its other end to one arm 22 of a bell crank lever 23 which is actuated by the same mechanism, such for example, as the throttle lever 10 or the accelerator pedal 11 of the intake valve 47, as shown in Fig. 4. The arm 22 may be provided with various openings 24 to which the wire 9 may be attached for purposes of adjustment. A spring 25 is connected between the pointer 8 and the frame 12 for the purpose of returning the pointer to its initial position.

The pointer 8 is moved along the rod 21 in accordance with the opening of the throttle. The scale 6 on the drum 5 comprises a series of spaces 26, 27, 28, 29, 30, 31 and 32 arranged diagonally as in the example illustrated and each of which represents a different speed from 10 to 70 miles per hour, in the instance illustrated. The scale is also provided with markings 33 along one edge representing the per cent grade. It will be understood that for various speeds and throttle openings the spaces may not always be diagonally arranged.

With the above arrangement if the vehicle is traversing no grade the pointer 8 will be moved to a position which coincides with one of the spaces 26—32 corresponding to the speed the vehicle should be traveling at that particular throttle opening. Now if the vehicle is traversing a grade the drum will be turned in accordance therewith and if the throttle, and, consequently, the pointer is not altered a different space 26—32 will coincide with the pointer showing the normal speed that the vehicle should have for that throttle opening at that particular grade. This indication should correspond with the speed as indicated by the speedometer. If it is lower the vehicle is inefficient and the correct efficiency may be obtained by the ratio of the indication of my indicator to the speed, as indicated by the speedometer.

I further provide a scale 34 and a manually set pointer 35 for facilitating the keeping of a record of the fuel used for a trip, and also a scale 36 and a manually set pointer 37 to facilitate keeping a record of the lubricants used for a trip.

It will be understood that my invention is also a grade meter, as it indicates the grade being traversed by the vehicle. It may also be used to indicate the position of the throttle or the position of a foot lever or a hand lever.

My invention is not limited to the specific structure illustrated, as various modifications may be made therein without departing from the spirit and scope of the invention, as set forth in the appended claims.

I claim as my invention:

1. An indicating device for an automotive vehicle comprising a chart and a co-operating pointer, and gravity actuated means for actuating one in accordance with the grade traversed by the vehicle and means for actuating the other in accordance with the extent of throttle opening of the motor of the vehicle.

2. An indicating device for an automotive vehicle comprising means responsive to the throttle opening of the motor of the vehicle and co-operating means responsive to the grade being traversed by the vehicle for indicating the normal speed of the vehicle under various conditions of operation.

3. An indicating device for an automotive vehicle comprising means for indicating the speed the vehicle should develop under any given conditions, said means comprising two co-operating means respectively responsive to the throttle opening and grade being traversed by the vehicle.

4. An indicator for an automotive vehicle comprising means for indicating the grade of the road being traversed and co-operating means actuated in accordance with the throttle position of the vehicle for indicating the normal speed of the vehicle on that grade for corresponding throttle positions.

5. An indicator for an automotive vehicle comprising a drum having indicia thereon, a pointer for the indicia actuated in accordance with the throttle opening of the motor of the vehicle and means for actuating the drum in accordance with the grade being traversed.

6. An indicating device for an automotive vehicle comprising a drum having a chart thereon, a weight for turning the drum in accordance with the grade being traversed by the vehicle, a pointer for the chart, and means controlled by the throttle lever of the vehicle for actuating the pointer.

7. An indicating device for an automotive vehicle comprising a drum having a chart thereon, a weight suspended within the drum, and gearing between the weight and drum for causing the drum to be turned when the weight is displaced by reason of the vehicle traversing a grade, a pointer for the chart, means controlled by the throttle of the vehicle motor for actuating the pointer.

In testimony whereof I have hereunto subscribed my name this 27th day of February, 1922.

JAMES M. BROWN.